March 31, 1964 S. TERMAN 3,127,143

PORTABLE PROP FOR TELEVISION TUBE

Filed May 8, 1961 2 Sheets-Sheet 1

INVENTOR.
SYDNEY TERMAN
BY Morris Spector
ATTY.

March 31, 1964 S. TERMAN 3,127,143

PORTABLE PROP FOR TELEVISION TUBE

Filed May 8, 1961 2 Sheets-Sheet 2

INVENTOR.
SYDNEY TERMAN
BY Morris Spector
ATTY.

United States Patent Office 3,127,143
Patented Mar. 31, 1964

3,127,143

PORTABLE PROP FOR TELEVISION TUBE

Sydney Terman, Chicago, Ill.
(4421 Estes Ave., Lincolnwood, Ill.)

Filed May 8, 1961, Ser. No. 108,464
3 Claims. (Cl. 248—125)

This invention relates to improvements in props for supporting cathode ray tubes, and, in particular, television picture tubes.

In order to obtain convenient access to some components of television sets during servicing of the sets, it often becomes desirable or necessary to remove the picture from its mounting in the cabinet of the set. The picture tube may then be placed adjacent to the cabinet or chassis in a horizontal position for testing where the front face of the tube is visible. Difficulty has been encountered in safely supporting the tube when removed from its normal mounting, and particularly so where the tube is to be placed on its side so that the front face of the tube is visible to the service man. Conventional circular or rectangular tubes cannot securely support themselves when placed on their side without utilizing the narrow, fragile necks of the tubes as part of the tube support. This is undesirable because the tube necks are the weakest portions of the tubes, and they cannot safely support any substantial portion of the weight of the tubes or withstand substantial shocks.

It is also desirable in most instances to use a small size picture tube for test purposes and to place such a tube within the chassis of the set or outside thereof adjacent to the chassis. This is particularly true in those sets which have a vertical chassis because in such sets the chassis is usually removed from the cabinet leaving the picture tube mounted within the cabinet. If the small temporary test tube is placed within the chassis in lieu of the regular picture tube and connected into the picture tube socket of the chassis, there is frequently no way in which the test tube can be properly supported on the chassis. Under these conditions the fragile neck of the tube is required to carry the entire weight of the tube.

It is an object of the present invention to provide a prop for supporting a cathode ray tube, such as a television tube, and is particularly useful in supporting the tube during service or testing of television sets.

It is also an object of the present invention to provide a prop of the type stated in which the tube is supported in such a manner as to reduce the possibility of breakage while being supported thereby.

It is a further object of the present invention to provide a prop of the type stated which is capable of supporting a picture tube temporarily within or outside of a television set so that the neck of the tube carries none of the weight of the tube.

It is an additional object of the present invention to provide a prop of the type stated which is inexpensive to construct and highly portable. To this end the prop may be readily disassembled or set up, as desired, without the aid of tools.

The attainment of the above and further objects of the present invention will be apparent from the following specification taken in conjunction with the accompanying drawing forming a part thereof.

Figures 2, 6, 7, 8:
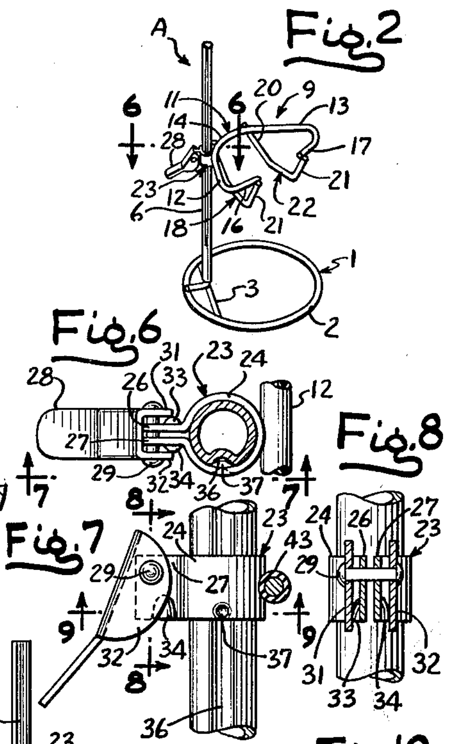
FIG. 2 is a perspective view of the prop.
FIG. 6 is a fragmentary sectional view, on an enlarged scale, taken along line 6—6 of FIG. 2.
FIG. 7 is a fragmentary sectional view taken along line 7—7 of FIG. 6.
Figure 10:
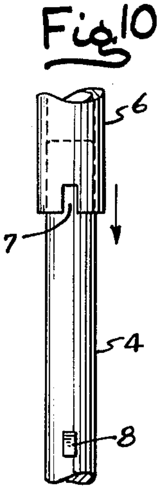
Figures 5, 9:
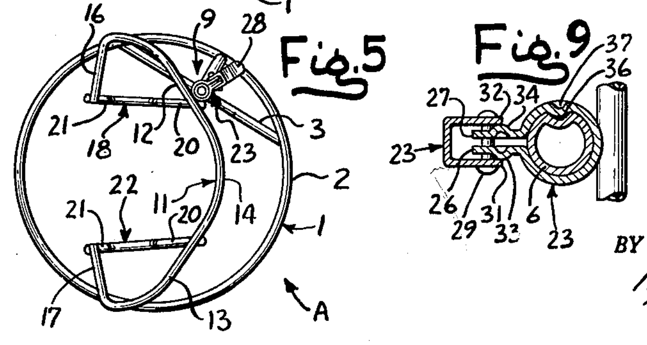
FIG. 5 is a top plan view of the prop.
Figures 11, 12, 13:
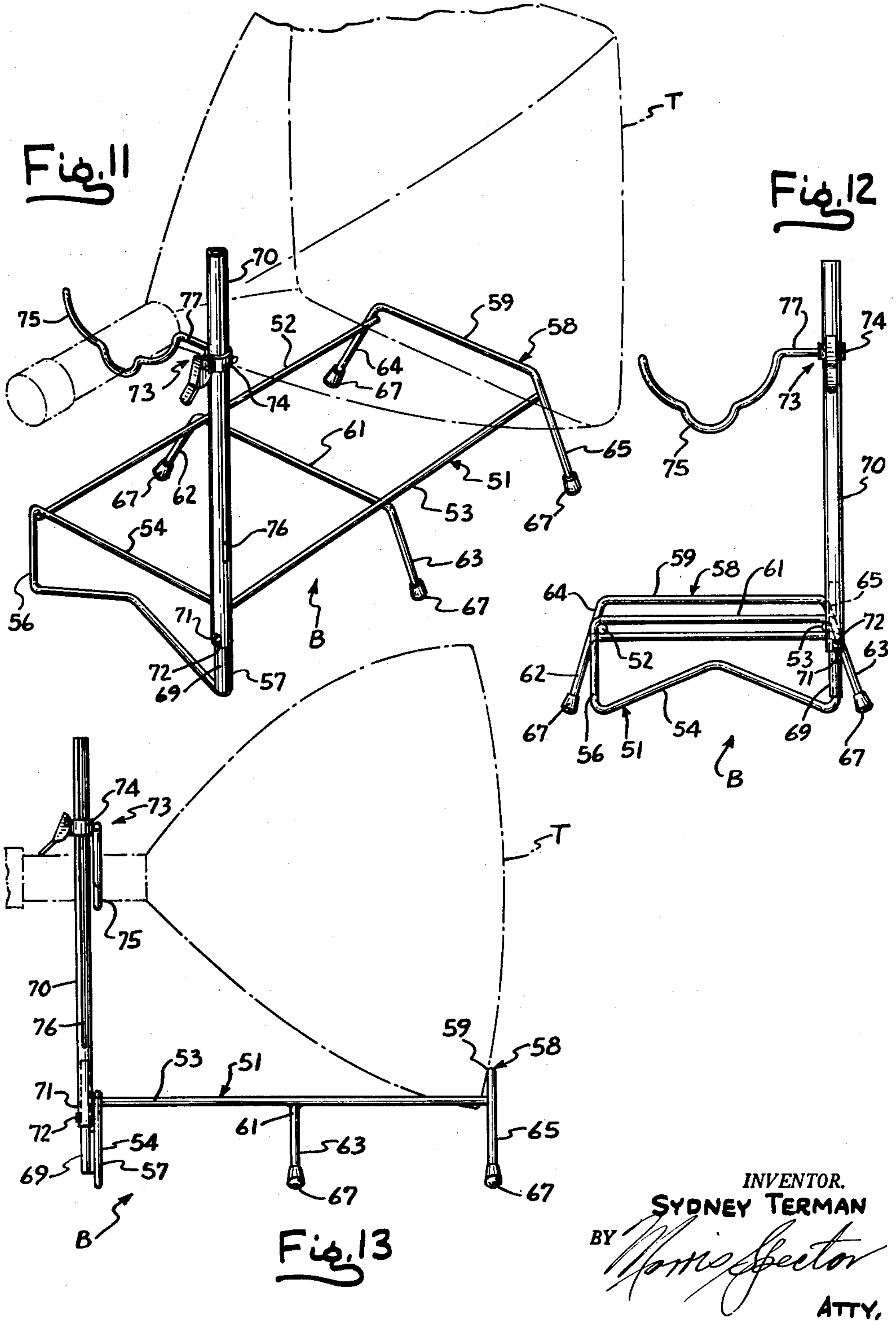

FIGS. 8 and 9 are fragmentary sectional views taken along lines 8—8 and 9—9 respectively of FIG. 7;

FIG. 10 is a fragmentary elevational view, on an enlarged scale, of a portion of the prop-standard and showing the interlocking means between the standard and base of the prop;

FIG. 11 is a perspective view of a modified form of prop embodying the present invention;

FIG. 12 is a rear elevational view of the prop of FIG. 11; and

FIG. 13 is a side elevational view of the prop of FIG. 11.

Referring now in more detail and by reference numerals to the drawing, which illustrates preferred embodiments of the present invention, A designates a prop comprising a base 1 formed by a wire rod 2 bent into the circular shape shown. The base rod 2 is reinforced by a chord-wise extending rod 3 which is welded at its opposite ends to the circularly shaped rod 2. Welded or otherwise rigidly secured to the rods 2, 3, and forming part of the base 1 is a standard-supporting rod 4 which projects upwardly a short distance at right angles from the plane of the rod 2. Provided for telescopic disposition over the rod 4 is a rigid tube or standard 6, the lower end of which is cut away to form a notch 7 (FIG. 10) for receiving a projection 8 at the lower end of the rod 4. In FIG. 10 the standard 6 is shown in a position just prior to being shifted downwardly to cause engagement of the projection 8 with the notch 7. When the projection 8 is in the notch 7, the standard 6 is restrained against rotation relative to the rod 4.

Mounted on the standard 6 and being slidable upwardly and downwardly therealong in overlying relation to the base 1 is a frame 9 which includes a wire-rod cradle 11. The cradle is formed by a U-shaped symmetrical, horizontally oriented, rod having arms 12, 13 which lie at an obtuse angle to each other and are joined through an arcuate apex portion 14. At their outer ends the arms 12, 13 are bent toward each other, ending in spaced terminal portions 16, 17 which project toward each other. A U-shaped rod 18 is secured at its opposite ends respectively to the terminal portion 16 and to a part of the leg 12 directly opposite the very tip of the terminal portion 16, so that the rod 18 depends from the plane of the arms 12, 13 and lies in a plane substantially at right angles thereto. Furthermore, the rod 18 has arms 20, 21 of unequal length, the arm 20 being shorter in length than the arm 21 and also being at a smaller angle to the vertical than is the arm 20. A U-shaped rod 22 identical to the rod 18, is secured to the very tip of the terminal portion 17 and to the part of the arm 13 directly opposite thereto.

Welded or otherwise rigidly secured to the arm 12 adjacent to the place of securement of the rod 18 and forming part of the frame 9 is a releasable clamping member 23 having a clamping band 24 which embraces the standard 25 and is provided with adjacent ears 26, 27 for pivotally supporting a lever 28. The lever 28 is carried by a pivot pin 29 which projects through the ears 26, 27 and spaced parallel flanges 31, 32 formed on the lever 28. Detents 33, 34 are outwardly struck from the ears 26, 27 so that when the lever is shifted counterclockwise (FIG. 7), the flanges 31, 32 will engage the detents 33, 34, pressing the ears 26, 27 together and clamping the band 24 snugly onto the standard 6. By shifting the lever 28 clockwise, the band 24 is released to permit the cradle 11 to be shifted upwardly or downwardly to a selected position above the base 1. To prevent rotation of the cradle 11 with respect to the standard 6, the latter is formed with a longitudinally extending groove 36 which receives an inwardly projecting detent 37 on the band 24.

Figure 1:
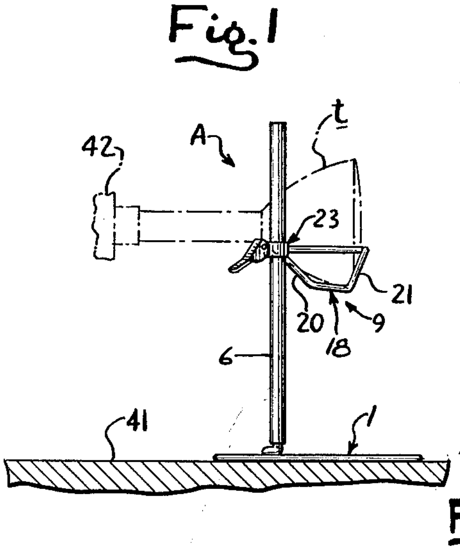
FIG. 1 is a side elevational view of a cathode ray tube prop constructed in accordance with and embodying the present invention, and showing the prop supporting the tube.
Figures 3, 4:
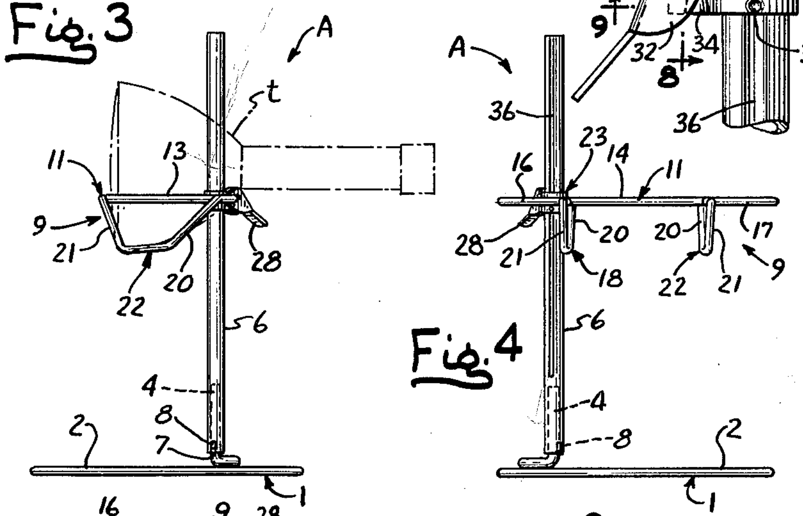
FIG. 3 is an elevational view of the prop as seen from the side opposite that of FIG. 1.
FIG. 4 is a front elevational view of the prop.

As seen by reference to FIGS 1 and 3, the head of a cathode ray tube *t* (such as a television picture tube) rests in the cradle 11 and is supported thereby. The neck of the tube *t* is disposed in a substantially horizontal fashion and the neck does not bear any of the weight of the tube *t* when the latter is supported by the craddle 11. The prop A may be placed adjacent to a vertical type chassis which has been removed from the cabinet with the base 1 resting on a suitable supporting surface 41, such as a workbench or floor. The tube *t* may, if desired, be connected into the picture tube socket 42 of the chassis or, alternatively, the connection between the tube *t* and tube socket 42 may be made by a jumper cable (not shown).

The entire cradle 11 may be dipped in a bath of rubber or rubber-like insulating material in a semi-liquid stage to coat the wire rods of the cradle 11 with a layer of insulating material 43, shown in FIG. 7. Polychloroprene and polyethylene have been found to be suitable for the insulating material 43 since these materials will dry to form a soft, somewhat resilient covering over the wire rods of the cradle 11. If desired, the wire rods 2, 3 of the base 1 may also be coated with insulation of the foregoing type. The insulation 43 minimizes the danger of electrical shocks as well as scratching and other possible injury to the tube *t*.

The prop A is easily assembled and disassembled without the aid of tools. Furthermore, the engagement between the notch 7 and projection 8 as well as the engagement of the detent 37 with the grove 36 permits proper assembly of the prop A so that the cradle 11 lies approximately over the center of the base 1. Therefore, when the tube *t* is placed within the cradle 11, the center of gravity of the assembled tube *t* and prop A will lie well within the base, so as to provide a stable support for the tube *t*.

It is also possible to provide a modified form of prop B shown in FIGS. 11–13. The prop B comprises a base 51 having spaced parallel, horizontal side rods 52, 53 and a rod 54 welded or otherwise permanently secured to the corresponding ends of the rods 52, 53. The rod 54 is bent to form a closed loop lying in a plane substantially at right angles of the plane formed by the wide rods 52, 53 and has depending legs 56, 57. Welded to and extending between the opposite ends of the side rods 52, 53 is a rod 58 having bight portion 59 lying above the plane of the side rods 52, 53. Approximately mid-way the rods 54, 58 is a rod 61 which is welded to the side rods and supports the central part of the frame 51. Rods 58, 61 are each bent to form widely spaced diverging feet 62, 63, 64, 65 which hold the base 51 in closely spaced relationship between the supporting surface. Rubber sleeves 67 may be fitted over the ends of the diverging feet. The rods constituting the base 51 may be dipped in a bath of rubber-like insulating material to provide an insulating covering similar to the insulated covering 43 previously described.

Welded or otherwise rigidly secured to the leg 57 and projecting upwardly therefrom is a standard-supporting rod 69 for telescopingly receiving a standard 60 which is similar to the standard 6, previously described. A notch 71 at the lower end of the standard 70 receives a projection 72 on the rod 69. Mounted on the standard 70 and cantilevered therefrom is a frame 73 which includes a clamping member 74, identical with the clamping member 23, and a U-shaped upwardly open cradle or neck rest 75. The cradle 75 has a lateral arm 77 which is welded or otherwise permanently secured to the clamping member 74. The detent 75 of the clamping member 74 fits within the longitudinal groove 76 in the standard 70 so that the cradle 75 is held above the rod 54 and approximately in the same plane therewith. Like the base rods, the cradle 75 is coated with a rubber or rubber-like insulating material.

The prop B may be used to support a large television picture tube T, such as the tube which has been removed from the cabinet or chassis of the set. The head of the tube rests on the side rods 52, 53 and the neck of the tube is supported within the cradle 75. The bight 59 constitutes an abutment for the base of the tube T to prevent the latter from accidentally sliding off the base 51. When the tube T is suported on the prop B, the tube T may be connected into the tube socket of the television set by the jumper cable.

From the foregoing it will be apparent that the neck rest 75 may be removed from the standard 70 and the cradle 11 substituted therefor, so that the base 51 can be used to support the cradle 11 in lieu of the base 1. In a like manner, the neck rest 75 may be mounted on the standard 6 in lieu of the cradle 11. Thus, in the present invention there is the flexibility resulting from interchangeability of parts of the props A and B.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and desired to be secured by Letters Patent is:

1. A prop for a cathode ray tube, said prop comprising a base having spaced parallel rods forming the sides thereof, a support rod joined to and extending transversely between the side rods and projecting downwardly therefrom to form a support for one end of the frame, additional support rods spaced from each other and the first mentioned support rod and extending transversely of the side rods, said additional support rods being connected to the sides and projecting beyond the side rods and being bent to form widely spaced feet to hold the prop in closely spaced relationship to a supporting surface, a standard mounted on the base at said one end thereof and projecting upwardly therefrom and a frame including a cradle mounted on the standard and cantilevered therefrom and lying above the base at said one end of the frame for supporting the neck of a cathode ray tube resting on the base.

2. A prop for a cathode ray tube, said prop comprising a base having spaced parallel rods forming the sides thereof, a support rod joined to and extending transversely between the side rods and projecting downwardly therefrom to form a support for one end of the frame, additional support rods spaced from each other and the first mentioned support rod and extending transversely of the side rods, said additional support rods being connected to the sides and projecting beyond the side rods and being bent to form widely spaced feet to hold the prop in closely spaced relationship to a supporting surface, one of said additional support rods being at the opposite end of the frame and having the part thereof that extends between the side rods lying above the plane of the side rods and constituting an abutment for a cathode ray tube resting on the base, a standard mounted on the base at said one end thereof and projecting upwardly therefrom, and a frame including a cradle mounted on the standard and cantilevered therefrom and lying above the base at said one end of the frame for supporting the neck of the tube resting on the base, and a clamping member embracing the standard and for releasably securing the frame in any one of a plurality of positions above the base.

3. A prop for a cathode ray tube, said prop comprising a base having spaced parallel rods forming the sides thereof, a closed loop support rod joined to and extending transversely between the side rods and having leg portions projecting downwardly therefrom to form a support for one end of the frame, additional support rods in spaced parallel relation to each other and the first mentioned support rod and extending transversely of the side rods, said additional support rods being connected to the sides and projecting beyond the side rods and being bent to form widely spaced feet to hold the prop in closely spaced relationship to a supporting surface, one of said additional support rods being at the opposite end of the frame and having a part thereof that extends between the side rods lying above the plane of the side rods and constituting an abutment for the tube resting on the base, a standard removably mounted on the base at said one end thereof adjacent to one of said leg portions and projecting upwardly therefrom, and a frame including a U-shaped cradle mounted on the standard and cantilevered therefrom and lying above the base at said one end of the frame in approximate vertical alignment with said closed loop support rod, said cradle being covered with a resilient material and adapted for supporting the neck of the tube resting on the base, a clamping band embracing the standard and for releasably securing the frame in any one of a plurality of positions above the base, and rotatable means for drawing the clamping band tightly around the standard.

References Cited in the file of this patent

UNITED STATES PATENTS

| | | |
|---|---|---|
| 1,045,583 | Mills | Nov. 26, 1912 |
| 1,434,000 | Gibbs | Oct. 31, 1922 |
| 2,919,091 | Cook | Dec. 29, 1959 |

FOREIGN PATENTS

| | | |
|---|---|---|
| 169,645 | Switzerland | Aug. 16, 1934 |